United States Patent
Petz

[15] 3,707,099
[45] Dec. 26, 1972

[54] HEAD-ON WIRE STRIPPING TOOL

[72] Inventor: Edmund Petz, 3353 X Street, Omaha, Nebr. 68107

[22] Filed: Oct. 15, 1970

[21] Appl. No.: 80,960

[52] U.S. Cl. ................................................81/9.5 A
[51] Int. Cl. ...............................................H02g 1/12
[58] Field of Search .............81/9.5 R, 9.5 A; 72/391

[56] References Cited

UNITED STATES PATENTS

| | | | |
|---|---|---|---|
| 2,601,797 | 7/1952 | Holt | 81/9.5 A |
| 3,108,505 | 10/1963 | Bartley | 81/9.5 A |
| 3,422,708 | 1/1969 | Bieganski | 81/9.5 A |
| 2,735,320 | 2/1956 | Green | 81/9.5 A |
| 3,125,908 | 3/1964 | Rozmus | 81/9.5 A |

Primary Examiner—Theron E. Condon
Attorney—Zarley, McKee & Thomte

[57] ABSTRACT

A head-on wire stripping tool comprising upper and lower jaw members pivotally connected together at one end thereof and having a wire engaging clamp means at the other ends thereof which are normally spaced apart to define a wire receiving area therebetween. First and second stripping knives are longitudinally slidably mounted on the upper and lower jaw members respectively and are controlled by a trigger connected thereto which extends downwardly therefrom. A pistol grip type handle is pivotally secured to the upper jaw member and extends downwardly therefrom below the lower jaw member. Rearward actuation of the trigger to a first position, while grasping the handle, causes the clamp means to securely clamp the wire therebetween. Continued rearward actuation of the trigger to a second position causes the stripping knives to longitudinally move rearwardly with respect to the jaw members and clamp means to strip the insulation from the wire which is being held by the clamp means.

3 Claims, 5 Drawing Figures

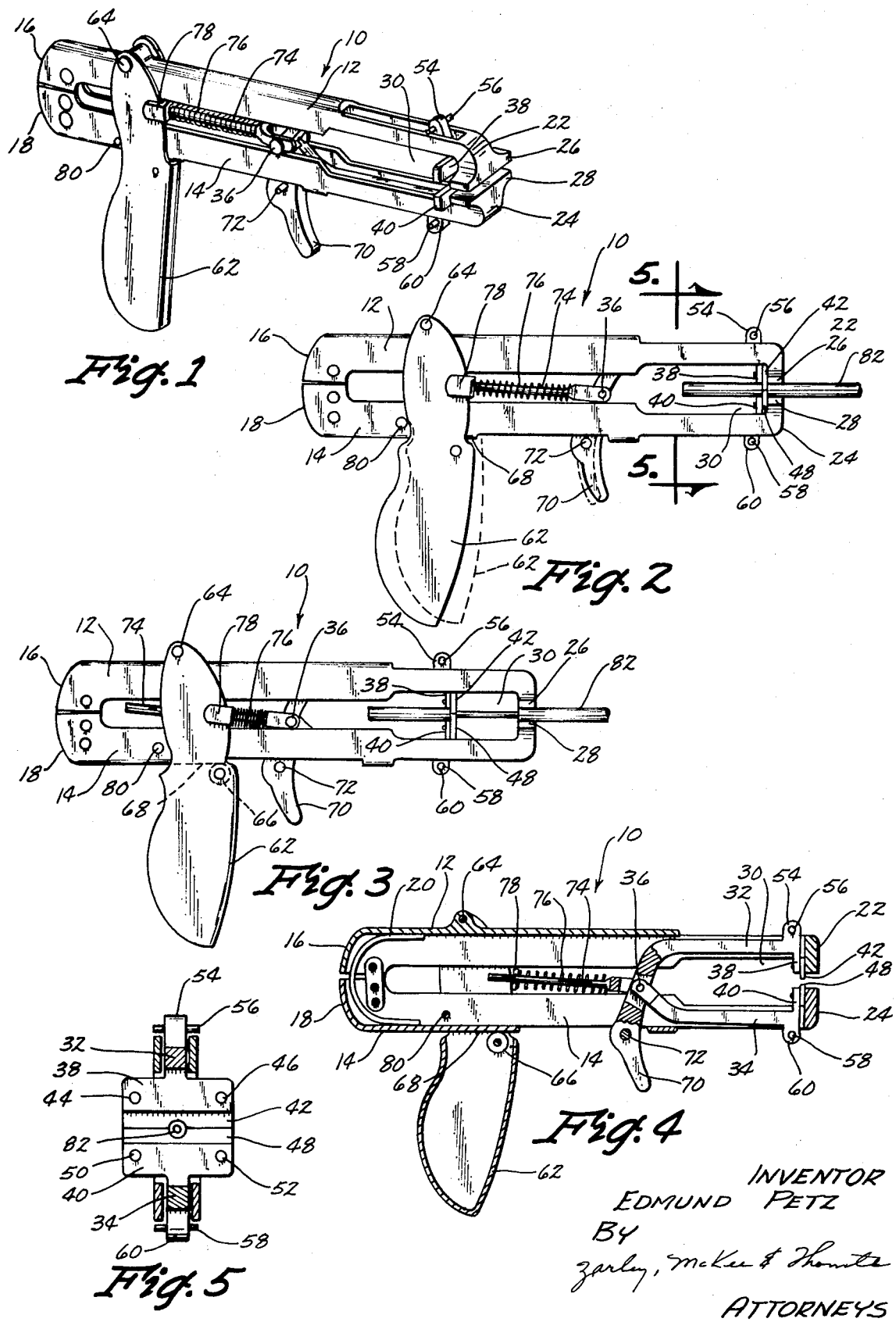

HEAD-ON WIRE STRIPPING TOOL

Wire stripping tools are generally of the pliers or scissors type and are used to strip the insulation from the wire. The conventional tools are difficult to use on those wires which are located in tight or cramped areas such as in television sets or the like. The reason for this difficulty is that the tool must be placed at a right angle with respect to the longitudinal axis of the wire and such an orientation is frequently inconvenient if not impossible. Further, the conventional tools must be moved along the wire to strip the insulation therefrom. This also requires that the person attempt to hold the wire portion that is not being stripped with his other hand while moving the tool outwardly therefrom. Obviously, such an operation is extremely inconvenient.

Therefore, it is a principal object of this invention to provide a head-on wire stripping tool.

A further object of this invention is to provide a wire stripping tool having means thereon to clamp the wire while the insulation is being stripped therefrom.

A further object of this invention is to provide a head-on wire stripping tool which may be used in cramped or tight areas.

A further object of this invention is to provide a wire stripping tool which is economical of manufacture, durable in use and refined in appearance.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a perspective view of the tool of this invention.

FIG. 2 is a side elevational view of the tool, the broken lines indicating the movement of the trigger and handle together with the upper and lower jaw members to a first position.

FIG. 3 is a view similar to FIG. 2 except that the trigger is illustrated in its rearwardmost position to effect the stripping of the insulation from the wire.

FIG. 4 is a partial sectional view to more fully illustrate the invention.

FIG. 5 is a sectional view taken along line 5 of FIG. 2.

The wire stripping tool of this invention is referred to generally by the reference numeral 10 comprising generally upper and lower jaw members 12 and 14 pivotally connected at their rearward ends 16 and 18 by any convenient means. The jaw members 12 and 14 are generally channel shaped and have a spring 20 positioned in the rearward ends thereof adapted to yieldably urge the ends 22 and 24 of the jaw members away from each other.

Jaw members 12 and 14 are provided with wire engaging clamp portions which are normally spaced apart to define a wire receiving area 30 therebetween. Support members 32 and 34 are longitudinally slidably mounted in the jaw members 12 and 14 respectively and are pivotally connected at their rearward ends by means of pin 36. Knife supports 38 and 40 are secured to the forward ends of support members 32 and 34 respectively by welding or the like. Knife 42 is secured to knife support 38 by means of screws 44 and 46 extending therethrough while knife 48 is secured to knife support 40 by means of screws 50 and 52 extending therethrough. The knives 42 and 48 are removably secured to their supports to permit various knives to be mounted on the tool. For example, if extremely heavy wire is to be stripped, it would be desirable to have knives mounted on the tool which have the proper size notch formed therein. The knives may also be provided with cutting surfaces at opposite sides of the notch formed therein to permit the device to cut through the insulation and/or wire if desired. Jaw member 12 has a slot formed in its upper forward end through which extends a tab 54 which is secured to the support member 32. A slide pin 56 extends through the portion 54 above the jaw member 12 to limit the downward movement of the knife support 38 with respect to the jaw member and to provide a guide means for the support member. A slot is also formed in the lower forward end of jaw member 14 with a slide pin 58 extending through portion 60 with the same purpose as the portion 54 and slide pin 56.

Handle 62 is pivotally connected at its upper end to the upper rearward end of jaw member 12 by means of pin 64. The upper portion of handle 62 embraces the handle portions 12 and 14 and extends downwardly therefrom. A roller 66 is rotatably mounted in the interior of the handle 62 at a point forwardly and below the pin 64. The roller 66 engages the bottom surface 68 of jaw member 14 as will be described more completely hereinafter. Trigger 70 is integrally formed with support member 32 and extends downwardly from the rearward end thereof through a slot formed in the bottom portion of jaw member 14 as illustrated in the drawings. Trigger 70 has a guide pin 72 extending therethrough to limit the vertical movement of the trigger with respect to the jaw member 14.

Rod 74 is connected to the support members 32 and 34 by the pin 36 and extends rearwardly therefrom. Spring 76 embraces the rod 74 and is maintained thereon by means of a spring keeper 78 through which the rod 74 slidably extends. Spring keeper 78 embraces the handle 62 between the jaw members 12 and 14 as seen in FIG. 2. As seen in FIG. 2, pin 80 extends through jaw member 14 rearwardly of the handle 62 and has its opposite ends protruding outwardly therefrom to limit the pivotal movement of the handle 62 with respect to the jaw members.

In operation, the wire 82 which is to be stripped of its insulation is placed in the wire receiving area 30 such as illustrated in FIG. 2 so that the longitudinal axis of the wire is parallel to the longitudinal axis of the jaw members 12 and 14. Initially, the trigger 70 and handle 62 are in the position illustrated by solid lines in FIG. 2. The tool is gripped much like a pistol with the trigger 70 being moved rearwardly towards the handle 62 to effect the stripping operation. Movement of the trigger 70 from the position illustrated by solid lines in FIG. 2 to the position illustrated by broken lines in FIG. 2 causes the handle 62 to pivot forwardly about pin 64 to the position illustrated by broken lines and causes the clamp portions 26 and 28 to move towards each other to securely clamp the wire 82 therebetween. The fact that the handle 62 pivots forwardly towards the trigger as just described permits the clamp portions 26 and 28 to clamp onto the wire 82 before the knife supports 38 and 40 are moved rearwardly. After the trigger 70 has been moved to the position illustrated by broken lines in FIG. 2, the trigger 70 is moved further rearwardly as illustrated in FIG. 3 which causes the support members 32 and 34 to move rearwardly with respect to jaw members 12 and 14 so that the knives 42 and 48 are pulled rearwardly along the wire 82 to strip the insulation therefrom. When the insulation has been stripped from the wire 82, the trigger is released and the trigger is returned to its original position by the spring 76. The jaw members 12 and 14 are pivotally moved outwardly with respect to each other by the spring 20 upon the trigger 70 being released.

The fact that the wire 82 can be inserted into the tool in a head-on manner permits the tool to be inserted into cramped quarters without the necessity of the operator's hand being inserted into the tight quarters. The clamp portions 26 and 28 securely hold the wire 82 while the knives strip the insulation therefrom which eliminates the need for the operator to use both of his hands for the stripping operation as required in conventional tools. Thus it can be seen that an extremely unique wire stripping tool has been provided which not only efficiently strips insulation from wires but which provides a convenient means for performing the stripping operation. Thus it can be seen that the tool accomplishes at least all of its stated objectives.

I claim:

1. A wire stripping tool comprising, first and second elongated jaw members having rearward and forward ends, said jaw members being operatively pivotally connected together at their rearward ends, said jaw members having wire engaging means at their forward ends which are normally spaced apart to define a head-on wire receiving area, first and second support members operatively longitudinally movably mounted on said first and second jaw members respectively, first and second stripping means on said first and second support members respectively positioned rearwardly of said wire engaging means, and actuating means connected to said jaw members and said support members for moving said wire engaging means into engagement with a wire in said wire receiving area and to cause said stripping means to engage the insulation on said wire and to move longitudinally rearwardly from said wire engaging means to strip the insulation from the wire, said actuating means comprising a handle means having one end thereof embracing said first and second jaw members and pivotally connected at its said one end to said first jaw member, a spring-loaded trigger means connected to said first and second support members forwardly of said handle means for moving said stripping means rearwardly from said wire engaging means, said handle means being pivotally movable between rearward and forward positions with respect to said jaw members, said handle means having means thereon which engages said second jaw member to cause said jaw members to move towards each other to cause said wire engaging means to engage said wire when said handle means is moved to its said forward position.

2. The tool of claim 1 wherein said means on said handle means comprises a roll-pin positioned forwardly of the pivotal connection of said handle means and said first jaw member.

3. The tool of claim 1 wherein a spring means engages the rearward ends of said jaw members to yieldably maintain said wire engaging means in a spaced apart relationship.

* * * * *